US007665718B1

(12) United States Patent
Benson

(10) Patent No.: US 7,665,718 B1
(45) Date of Patent: Feb. 23, 2010

(54) HOSE FITTING INSERTER

(76) Inventor: Joel Kent Benson, 601 S. Ridgeway Dr., Cleburne, TX (US) 76033

( * ) Notice: Subject to any disclaimer, the term of this patent is extended or adjusted under 35 U.S.C. 154(b) by 0 days.

(21) Appl. No.: 11/933,133

(22) Filed: Oct. 31, 2007

Related U.S. Application Data

(63) Continuation-in-part of application No. 10/940,203, filed on Sep. 13, 2004, now Pat. No. 7,322,085, which is a continuation-in-part of application No. 10/732,675, filed on Dec. 9, 2003, now abandoned, which is a continuation-in-part of application No. 10/074,570, filed on Feb. 12, 2002, now Pat. No. 6,658,711.

(60) Provisional application No. 60/539,558, filed on Jan. 27, 2004.

(51) Int. Cl.
*B23P 19/04* (2006.01)

(52) U.S. Cl. ................................ 269/237; 269/3; 269/6

(58) Field of Classification Search ................. 269/237, 269/6, 3, 95
See application file for complete search history.

(56) References Cited

U.S. PATENT DOCUMENTS 874,123 A * 12/1907 Sinclair ...................... 269/131
1,094,978 A * 4/1914 Church ........................ 29/237
2,821,775 A 4/1958 Pavelka
2,916,812 A 12/1959 Milo
2,949,947 A 8/1960 Story
4,083,624 A 4/1978 Timmer
4,349,931 A * 9/1982 Leon .......................... 470/207
4,770,401 A * 9/1988 Donaldson .................. 269/249
4,811,441 A * 3/1989 Potesta .......................... 7/158
4,854,568 A 8/1989 Baeza et al.
4,893,801 A 1/1990 Flinn
5,009,134 A 4/1991 Sorensen et al.
5,099,561 A 3/1992 Santiago Lozano
5,125,324 A * 6/1992 Araki et al. .................. 91/454
5,161,787 A 11/1992 Hobday
5,222,420 A 6/1993 Sorensen et al.
5,375,309 A 12/1994 Dunn
5,833,359 A 11/1998 Hollenbach
6,029,964 A 2/2000 Bohl
6,658,711 B1 * 12/2003 Benson ........................ 29/237
6,896,248 B1 * 5/2005 Andulics ....................... 269/3
7,322,085 B1 * 1/2008 Benson ........................ 29/237
2002/0042979 A1 * 4/2002 Ishida et al. .................. 29/237

* cited by examiner

*Primary Examiner*—Lee D Wilson
(74) *Attorney, Agent, or Firm*—Deborah A. Peacock; Justin R. Jackson; Peacock Myers, P.C.

(57) ABSTRACT

A powered or hand-activated stationary and/or portable hose fitting insertion apparatus and method. A hose is preferably held in place with a clamp, strap or other apparatus on a platform or in a trough and a fitting is caused to be inserted into an end of the hose by a force applied to the fitting from a pad.

25 Claims, 8 Drawing Sheets

BARBMASTER II

CLAMP ROTATION
LOCKING ROTATION
RELEASE ROTATION
DETAIL A
NOT TO SCALE
INSERTED BARBED FITTING
1
2
3
4
5
6
7
8
9
10
11
12
13
14
15
16
17
20
21
32

BARBMASTER II
(OPPOSING JAW METHOD)

HOSE FITTING INSERTER

CROSS-REFERENCE TO RELATED APPLICATIONS

This application is a continuation-in-part application of U.S. patent application Ser. No. 10/940,203, entitled "Portable Hose Fitting Inserter," filed on Sep. 13, 2004, which claimed priority of U.S. Provisional Patent Application Ser. No. 60/539,558, entitled "Hose Fitting Inserter," filed on Jan. 27, 2004, and which is a continuation-in-part application of U.S. patent application Ser. No. 10/732,675, entitled "Method and Apparatus for Installing Hose Fittings," to Joel Kent Benson, filed on Dec. 9, 2003, now abandoned, which itself is a continuation-in-part application of U.S. patent application Ser. No. 10/074,570, entitled "Hose Fitting Insertion Apparatus," to Benson, filed on Feb. 12, 2002, and issued as U.S. Pat. No. 6,658,711 on Dec. 9, 2003, and the specifications and claims of those applications are incorporated herein by reference.

BACKGROUND OF THE INVENTION

1. Field of the Invention (Technical Field)

The present invention relates to a method and apparatus for installing a hose fitting into the open end of a hose. Particularly, the present invention relates to a method and apparatus for rapid installation of a fitting into a hose with a portable handheld device.

2. Description of Related Art

Hose fitting installation apparatuses are known in the art. U.S. Pat. No. 4,811,441, to Potesta is one such known hose fitting installation apparatus. The apparatus of Potesta and others, however, must typically be mounted onto a workbench or table. Users of such equipment must typically deal with the end portion of the hose buckling, bending, and compressing under the force of the fitting being inserted therein. Further, devices currently known are not only difficult to use and lack portability, but also make it impossible to service a hose located adjacent to or inside a piece of machinery. Since repair of hoses in "mid-air" is not typically possible with the devices of the prior art, and because hoses are typically located adjacent to or inside a piece of machinery, a user is often forced to remove an entire section of hose. Since such hoses must be disconnected, drained, and removed from their routing retainers, before taking them from the field and into a repair shop, where the bench holding the fitting installation device is typically disposed, there is thus a present need for an easily operable, hand-controlled apparatus, which is entirely portable for use in any needed location, e.g. in the engine room of a ship, the air lines of a tractor-trailer rig, or within or on a piece of equipment that needs repairing. Further, there is a need for such an apparatus with which the operator may both hold the hose end securely in position to receive the hose fitting, and also quickly push the hose fitting into the secured end of the hose, to permanently install the fitting in the hose.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

BRIEF SUMMARY OF THE INVENTION

Figure 1:
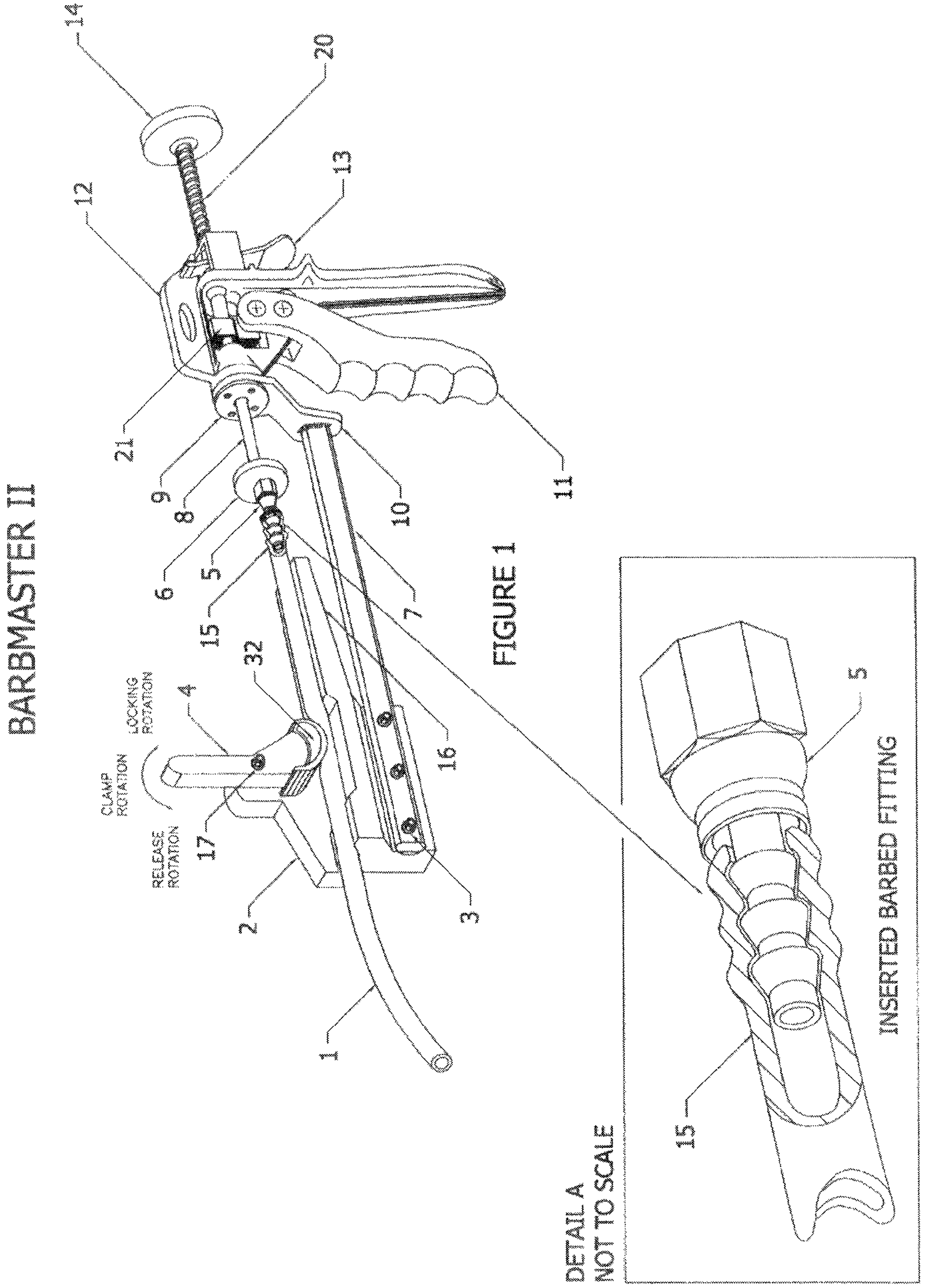
FIGS. 1 and 2 are drawings illustrating perspective views of embodiments of the present invention wherein one or more cam-shaped members are used to hold a portion of a hose during installation of a fitting.

The present invention relates to an apparatus which includes a mounting bar, a fitting inserter attached to a first end of the mounting bar, and a hose securer attachable to a second end of the mounting bar. The mounting bar includes a platform, one or more cam-shaped members, a translationally movable shaft, a pushing mechanism for imparting translational movement to the shaft, and a release mechanism. The apparatus can also include a pad disposed on a first end of the shaft; a stop disposed on a second end of the shaft, and could incorporate a retraction spring. The retraction spring can be disposed around the shaft and is preferably located on the backside of the pusher mechanism. Optionally, the cam-shaped members can have a textured surface. Further, the hose securer can optionally include one or more springs, and the cam-shaped members can reside in a communicable relationship with the springs.

The pushing mechanism can include a friction drive mechanism or a notched push-rod in communicable relationship to a round or semicircular drive gear. The hose securer can also include a lever, and the cam-shaped members can be disposed on a terminal portion of that lever. Optionally, the cam-shaped members of the present invention can be disposed on the platform. The hose securer can also include an extended hose-supporting member, called an ergonomic-wing, having one or more surfaces residing in a substantially parallel relationship with the mounting bar. The supporting member can include a trough. The trough can have virtually any shape including a v-shape and/or a u-shape.

The apparatus of the present invention can be hand powered, electrically powered, hydraulically powered, pneumatically powered, or any combination of these. The apparatus of the present invention can be mountable on a surface with the use of a table-vise or other securing mechanism. The pushing mechanism can be attached to the mounting bar with a spanner nut.

The present invention also relates to a method for inserting a fitting into a hose end which includes holding a fitting insertion tool comprising a fitting inserter and a hose securer in a user's first hand, wherein all of a weight of the tool is supported by the user's hand; providing a hose having at least a first end; disposing a first end of the hose into the hose securer; disposing a fitting partially within the first end of the hose; actuating a pushing mechanism; pressing the fitting into the first end of the hose with the pushing mechanism; and removing the hose from the hose securer. The method can also include activating a release mechanism for both the hose securer and the fitting pusher mechanism.

Pressing the fitting into the first end of the hose can include the user's hand repetitiously squeezing a handle portion of the fitting inserter. Disposing a first end of the hose into a hose securer can include contacting an outer surface of the hose with at least one cam-shaped compression member.

The present invention also relates to a method for inserting a fitting into a hose which includes disposing a hose having at least a first end into a hose securing mechanism; disposing a fitting at least partially within the first end of the hose; and advancing the fitting into the first end of the hose in a series of distinct advancements of substantially equal distances. The method can also include an additional clamping mechanism for securing an end portion of the hose with the hose securing mechanism, and/or retracting a translationally movable shaft.

In the method, advancing the fitting can include advancing the fitting with a translationally movable shaft, and/or repetitiously activating a pushing mechanism. Repetitiously activating a pushing mechanism can include repetitiously activating a hand-powered pushing mechanism.

The present invention is directed to an apparatus and method for inserting hose fittings into hose ends. Particularly, the present invention is directed toward a portable handheld apparatus which can install fittings into hoses in readily accessible and/or difficult to reach areas.

An objective of the present invention is to provide a method and apparatus for inserting hose fittings into hoses. Particularly, an objective of the present invention is to provide a user with the ability to insert fittings into hoses without requiring a user to completely remove the hose from the system.

A primary advantage of the present invention is that a method and apparatus are provided which enables hose fittings to be inserted into hoses of multiple diameters, even when the hose is in an area which is relatively difficult to access.

An embodiment of the present invention also relates to a an apparatus having a mounting bar, a fitting inserter attached to a first end of the mounting bar, the fitting inserter having a translationally movable shaft, and a hose securer comprising a clamp, said clamp adapted to hold a portion of a hose in place. In one embodiment, the fitting inserter includes a pad and/or one or more protrusions for holding a fitting. The clamp can include a strap and/or a compression plate. Further, the compression plate can have a curve and/or one or more textured surfaces.

An embodiment of the present invention also relates to a fitting insertion apparatus having a hose securer that includes an elongated surface for placement of at least a portion of a hose; and a fitting inserter having a translationally movable shaft. The hose securer can also include a clamp. The clamp can include a strap. The translationally movable shaft can be hand-powered, electrically-powered, pneumatically-powered, and/or hydraulically-powered.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by the instrumentalities and combinations particularly pointed out in the appended claims.

DETAILED DESCRIPTION OF THE INVENTION

The term "hose" as used throughout the specification, is meant to encompass all forms of hoses, tubes, and piping, including, but not limited to all forms of flexible and semi-flexible piping. The term "v-shaped channel" as used throughout the specification of the present invention, has been chosen solely for the purpose of maintaining consistency, and can also include any such apparatus which would perform a similar function such as a u-shaped channel, a flat plate, a completely or substantially enclosed structure such as a pipe, etc. Although the apparatus of the present invention is relatively small and thus readily portable, the apparatus of the present invention can also be secured to a base structure with the aid of a table-vise and/or fasteners and fastening methods readily understood to those skilled in the art. While the present invention teaches the use of a pad for pressing a fitting into a hose end, it is not mandatory that such surface be padded. Rather, this padding better enables the present invention to produce more desirable results since minimum damage will occur to the fitting from contact with this padded surface. The term "pad" as used throughout the specifications and claims is therefore not meant to be limited to only items having very low hardness values, but can also include items having greater hardness values. Such pads can therefore include but are not limited to rubbers, foams, plastics, composites, metals, ceramics, and woods.

The term "stop" as used throughout the specification and claims is intended to include any device, apparatus, fixture or element which can be used to prevent a shaft from traveling beyond a predetermined point. The term "stop" is also used for the sake of consistency and is also intended to include any device, apparatus, mechanism, handle, or element which can gripped by a user.

FIG. 1 shows one embodiment of the present invention. The hand-controlled movable fitting inserter of the present invention preferably has pad 6 for pressing fitting 5 into end portion 15 of hose 1. This embodiment of the present invention also has handle 11 and release mechanism 13 connected to pushing mechanism 10. By repetitiously squeezing handle 11, translational movement is imparted to shaft 8, thus causing pad 6 to move toward hose end 15. Platform 16 is attached to bar 17, preferably by bolts 3. Platform 16 preferably has a protrusion, called an ergonomic-wing, with a v-shaped trough disposed thereon, which aids in holding end portion 15 of hose 1. Hose locking lever 4 is rotatably attached to platform 16 by bolt and spacer assembly 17. Lever 4 preferably has at its bottom, cam-shaped compression member 32, which aids in securing end-portion 15 of hose 1 in the v-shaped trough during installation of fitting 5. As seen in FIG. 1, platform 16 is preferably disposed and configured such that its protruding ergonomic-wing lies substantially parallel to mounting bar 7.

Lever 4 is preferably so disposed as to allow end portion 15 of hose 1 to be passed onto the flat surface beneath compression member 32. In one embodiment, when the upper end of lever 4 is moved away from pushing mechanism 10, as shown in FIG. 1, compression member 32 is moved to the right and upward, thus providing a maximum opening between compression member 32 and the trough, with the dimensions being such as to accommodate a multitude of hose sizes. While the present invention can be made to accept virtually any hose diameter, the present invention preferably accepts hoses having an inside diameter of ¼"-1". When the upper end of lever 4 is moved to the right, compression member 32 is caused to move to the left and downward, so as to firmly press end portion 15 of hose 1 downward into a locked configuration in the v-shaped trough and flat portion of the mounting platform.

The more force that is applied to hose end-portion 15, via pad 6 through fitting 5, during motion operation of the present invention, the further back elliptical compression member 32 is pushed, and as a result the pressure applied to locking hose 1 in place increases. The mechanical action of cam-shaped compression member 32 thus ensures that the hose will not slip rearward during the fitting insertion process. In addition, spacing adapter pads are optionally incorporated below the compression member in order to accommodate the various hose sizes.

Figure 2:
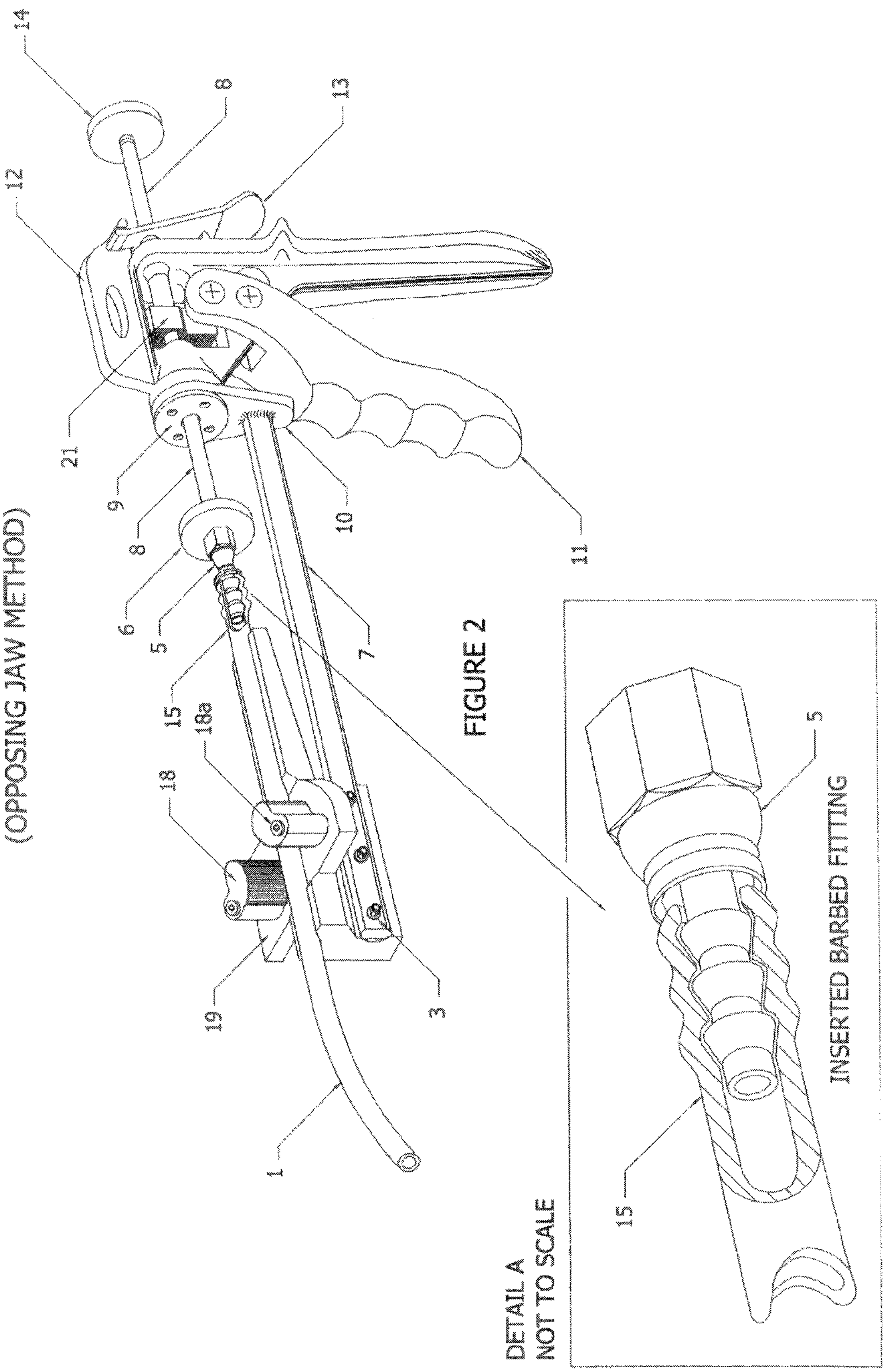

An alternative embodiment of the present invention is depicted in FIG. 2. In this embodiment, the insertion mechanism preferably remains the same as that previously disclosed. Lever 4 is preferably replaced with cams 18 which are mounted on platform 19. Platform 19 preferably has cams 18 that are preferably spring loaded in a closed position in order to secure hose 1. After hose 1 is fed through cams 18, cams 18 preferably close and hold hose 1. When fitting 5 is forced into end portion 15 of hose 1, cams 18 are preferably forced to rotate inward slightly, thus imparting a pinching force to hose 1 which prevents it from retreating away from pad 6.

An alternative embodiment of the present invention uses a hose securing mechanism which operates in a manner similar to that of the known as Irwin's® Quick-Grip Handi-Clamp. In this embodiment, a two-piece, internally textured hollowed-cylinder block having a shape similar to that of a clamshell is used. A hand-powered locking mechanism for the opposing members is preferably provided. Handles are preferably attached to the upper and lower members and are preferably coupled to a quick-releasing, semi-circular, toothed, locking member. When opposing mating surfaces are brought together around hose 1, the locking parts preferably engage one another and the clamshell shape secures the hose in place.

Of course any of the hose securing mechanisms described above can easily be converted to operate from a pneumatic, electric (AC or DC), or hydraulic source, as well as combinations of these. Those skilled in the art will readily recognize numerous mechanisms which can be used to hold hose 1 while fitting 5 is being forced therein.

Pushing mechanism 10 is preferably a type well known in the art, which has a one-way friction-powered drive mechanism. Although numerous manufacturers produce drive mechanisms, each of which will produce desirable results, the drive mechanism is preferably a Model No. JM-138-CH, as manufactured by Tianjin Jinmao Imp. & Exp. Corp., Ltd., Wang Zhuang Industrial Area, Beichen District, Tianjin 300134, China. It is also important to note that although the embodiment depicted in the figures is that which incorporates a friction-powered drive mechanism, other drive mechanisms can work and will also produce desirable results. Although those skilled in the art will readily recognize numerous mechanisms which can be adapted for use with the present invention, examples of drive mechanisms which can be used include electrically, pneumatically, and hydraulically powered mechanisms as well as manually operated screw-type mechanisms and combinations of these. Further, a shaft can be provided which has toothed protrusions extending along the length of the shaft which interact with a ratchet-type mechanism incorporating some type of drive gear. If a powered mechanism is used, a trigger is preferably disposed on the apparatus which enables a user to operate the powered mechanism by simply squeezing the trigger. Each of the mechanisms can optionally operate in reverse such that shaft 8 is pulled away from hose end portion 15 when the mechanism is operated. Regardless of the manner of operation of the drive mechanism, the drive mechanism ultimately selected preferably has the ability to cause pad 6 to be shoved in a direction substantially parallel with bar 7.

When using a hand-powered apparatus, successive hand compressions of handle 11 cause pad 6 to travel away from handle 11. Activating release mechanism 13 with one hand and pulling on stop 14 with the other hand enables the operator to slide shaft 8 away from platform 16. Since pad 6 is fixedly attached to an end of shaft 8, pad 6 moves away from hose end portion 15 as shaft 8 is retracted. Stop 14 is preferably fixedly attached to an end of shaft 8 opposite that of pad 6. Stop 14 not only prevents shaft 8 from traveling too far, and thus leaving the ratcheting mechanism, but also provides a gripping area for a user to pull on when moving pad 6 away from end portion 15 of hose 1. Although shaft 8 can easily be retracted by pulling on stop 14, a spring 20 can optionally be disposed around shaft 8 such that the spring is compressed by stop 14 as shaft 8 is forced forward. Upon activating release mechanism 13, potential energy stored in the spring is used to return shaft 8 to its retracted position.

The protruding portion/ergonomic-wing of platform 16 preferably has smooth corners and edges, forming an ergonomic design, which allows the operator to wrap fingers around end portion 15 of hose 1, which is preferably disposed in the v-shaped tough. This helps to prevent hose 1 from buckling during the fitting insertion operation.

For the embodiment of FIG. 1, operation of the invention is straightforward. First, the operator rotates lever 4 such that sufficient clearance is provided for end portion 15 to pass beneath compression member 32 and onto the flat surface area of the platform. End portion 15 is preferably positioned about 1.5 inches to 2.5 inches past a terminal portion of the trough. This provides an un-deformed end and enough length for compression dynamics of hose 1 during the insertion of fitting 5. This placement may, of course, vary depending upon the nature and size of the hose material, as well as the fitting to be installed. Once the hose is suitably positioned in the trough, the operator then rotates the handle of lever 4 in such a manner as to cause compression member 32 of lever 4 to contact and lock end portion 15 of hose 1 in place.

After hose 1 is properly positioned, hose-fitting 5 is preferably lubricated by the operator, using a mild soap and water solution or alcohol. After lubrication has been applied, the operator partially inserts fitting 5 into end portion 15 of hose 1 with the user's hand. Using one hand, the operator preferably wraps and tightens fingers around end portion 15 of hose 1 and the protrusion of platform 16, so as to insure that end portion 15 will not buckle during the fitting insertion operation. Of course the hand and fingers can be replaced with a mechanical apparatus such as a Velcro® strap-like material, an additional clamp, or a semicircular rigid tube and clamp mechanism having an inside circumference only slightly larger than the outside circumference of the tube. The operator then causes shaft 8 to travel toward platform 16. For embodiments of the present invention which use a hand-operated mechanism, shaft 8 is preferably made to travel toward platform 16 by repeatedly squeezing and releasing handle 11 with a hand of the operator. This causes pad 6 to first engage an outer surface of fitting 5. Pad 6 then pushes fitting 5 as far into end portion 15 of hose 1 as is required so that fitting 5 is firmly secured upon the inner wall of end portion 15 of hose 1. This is illustrated in the enlarged sections of FIGS. 1 and 2.

After installation of fitting 5 in end-portion 16 of hose 1, the operator presses release mechanism 13, which allows shaft 8 and pad 6 to be moved away from platform 16. This releases the pressure on fitting 5 and hose 1. The operator then removes hose 1 from the fitting insertion tool. Fitting 5 is now fully inserted into hose 1.

Figure 3:
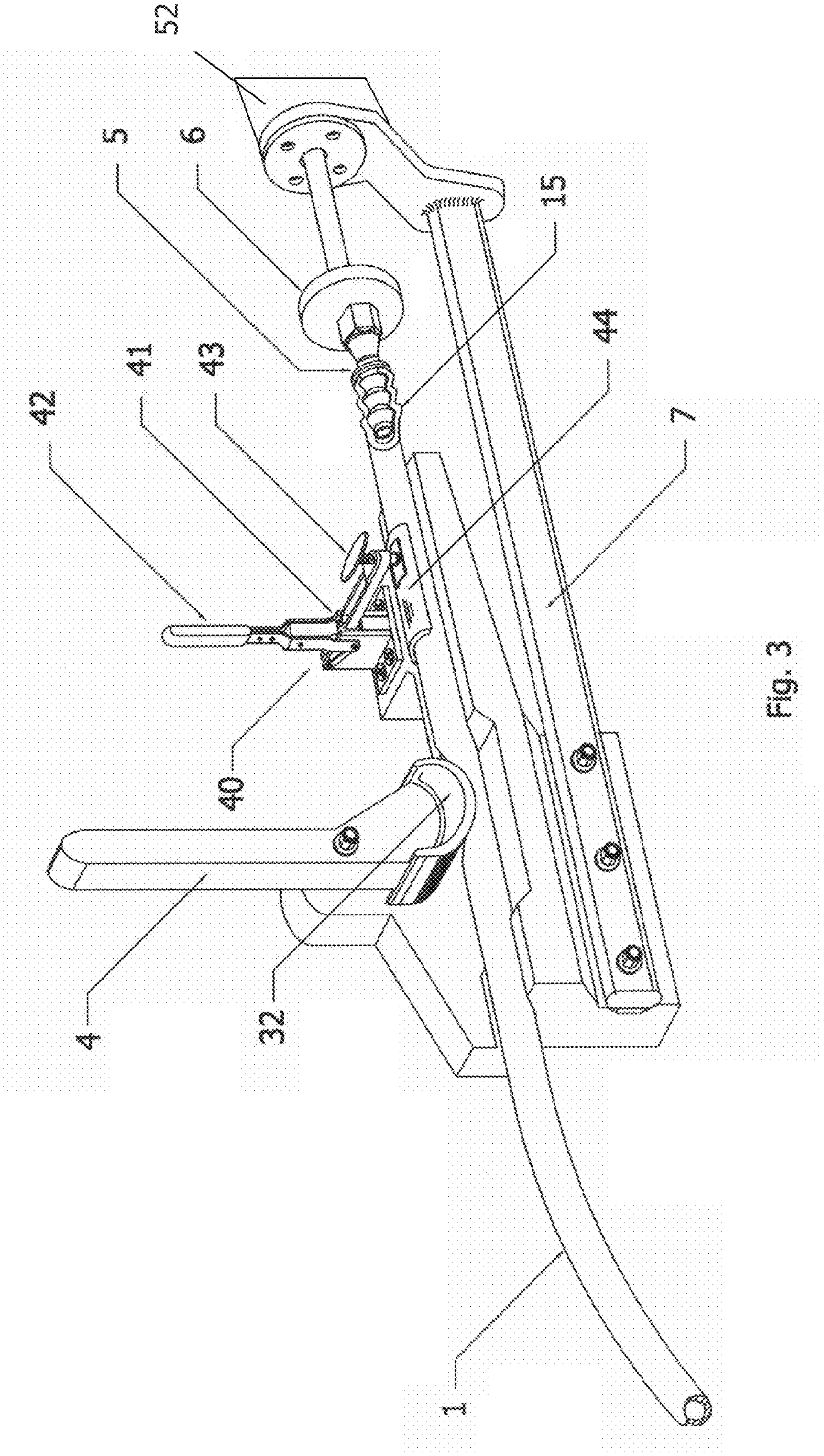
FIGS. 3 and 4 are drawings illustrating perspective views of an embodiment of the present invention wherein a clamping mechanism is used to hold a portion of a hose during installation of a fitting therein.
Figure 4:
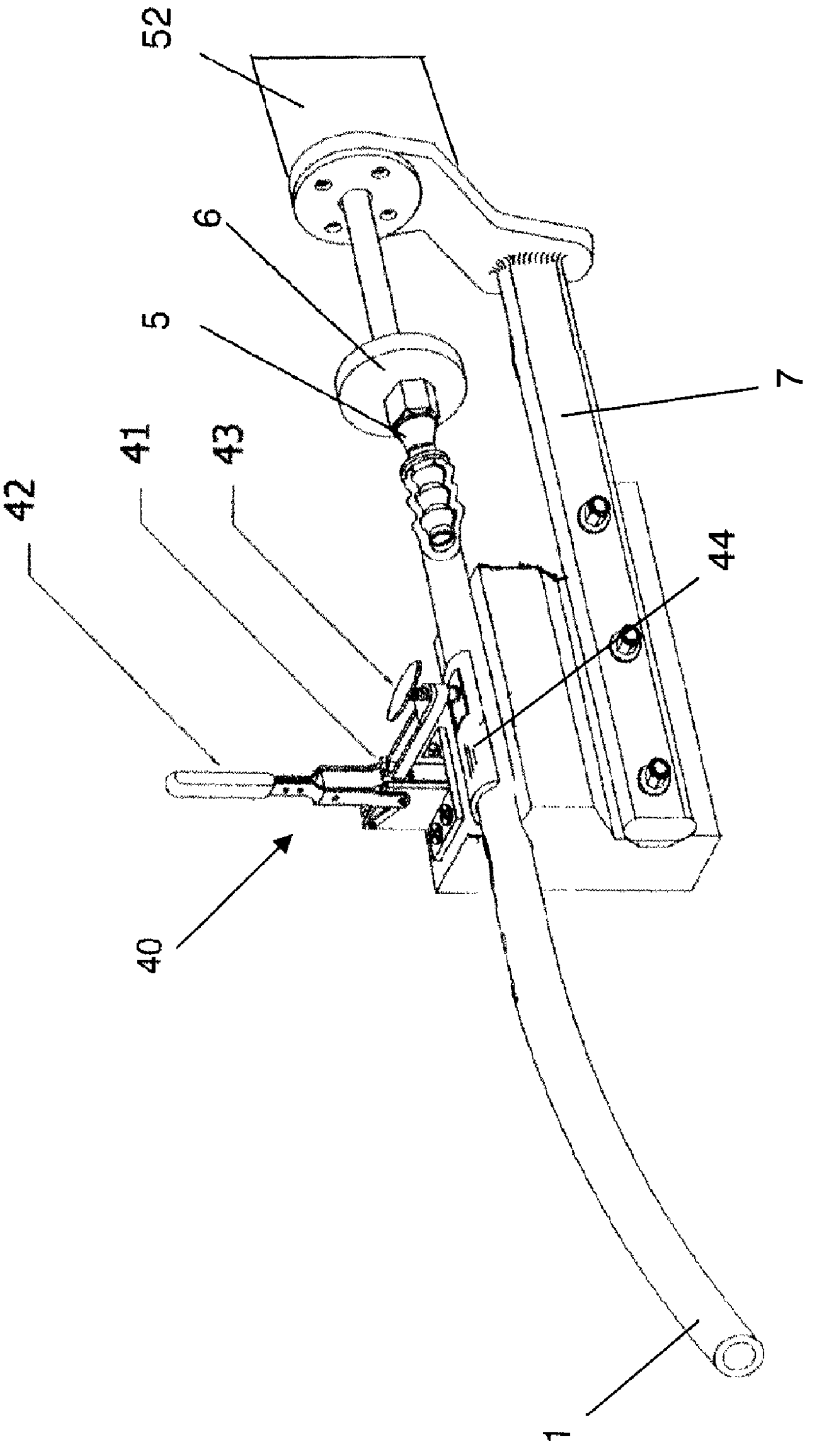

Referring now to FIGS. 3 and 4, an embodiment of the present invention is illustrated wherein lever-activated compression clamp 40 is used to partially or fully secure hose 1 while fitting 5 is installed into end portion 15. As illustrated in FIG. 3, lever-activated compression clamp 40 is provided in addition to lever 4 with cam-shaped compression member 32 disposed thereon. In this embodiment, lever-activated compression clamp 40 is preferably adjusted by a user by using diameter adjustment mechanism 43 in order to adjust clamp 40 to accommodate any desired hose diameter. After adjusting diameter adjustment mechanism 43, the user preferably activates clamp 40 by adjusting lever 42, thus engaging compression component 44. Although compression component 44 is illustrated as having a slight curvature, the curvature is not essential and desirable results can be provided by a flat or a v-shape. Further, as those skilled in the art will recognize, the shape of compression component 44 can be any number of shapes and sizes and will provide desirable results so long as compression component 44 helps hold hose 1 in place during installation of fitting 5. In one embodiment, one or more friction members are disposed on compression component 44, which can include, but are not limited to ribs and/or other surface textures.

As illustrated in FIGS. 3-7 mechanism 52 provides the power necessary to insert fitting 5 into end portion 15 of hose 1. As previously described, mechanism 52 can comprise mechanism 10 as illustrated in FIGS. 1 and 2, as well as any other apparatus capable of causing shaft 8 to move such that fitting 5 is inserted into end portion 15 of hose 1. Accordingly, mechanism 52 can comprise a hand-powered mechanism, as well as electrically, pneumatically, hydraulically-powered mechanisms. Although lever 4 can provide desirable results when used in combination with clamp 40, embodiments of the present invention also provide desirable results when clamp 40 is used alone and when lever 4 is thus not provided (see FIG. 4). As those skilled in the art will recognize upon studying this application, the exact shape, size, and operation of compression clamp 40 is not essential and desirable results can be achieved so long as a force is applied to help hold hose 1 in place during installation of fitting 5.

Figure 5:
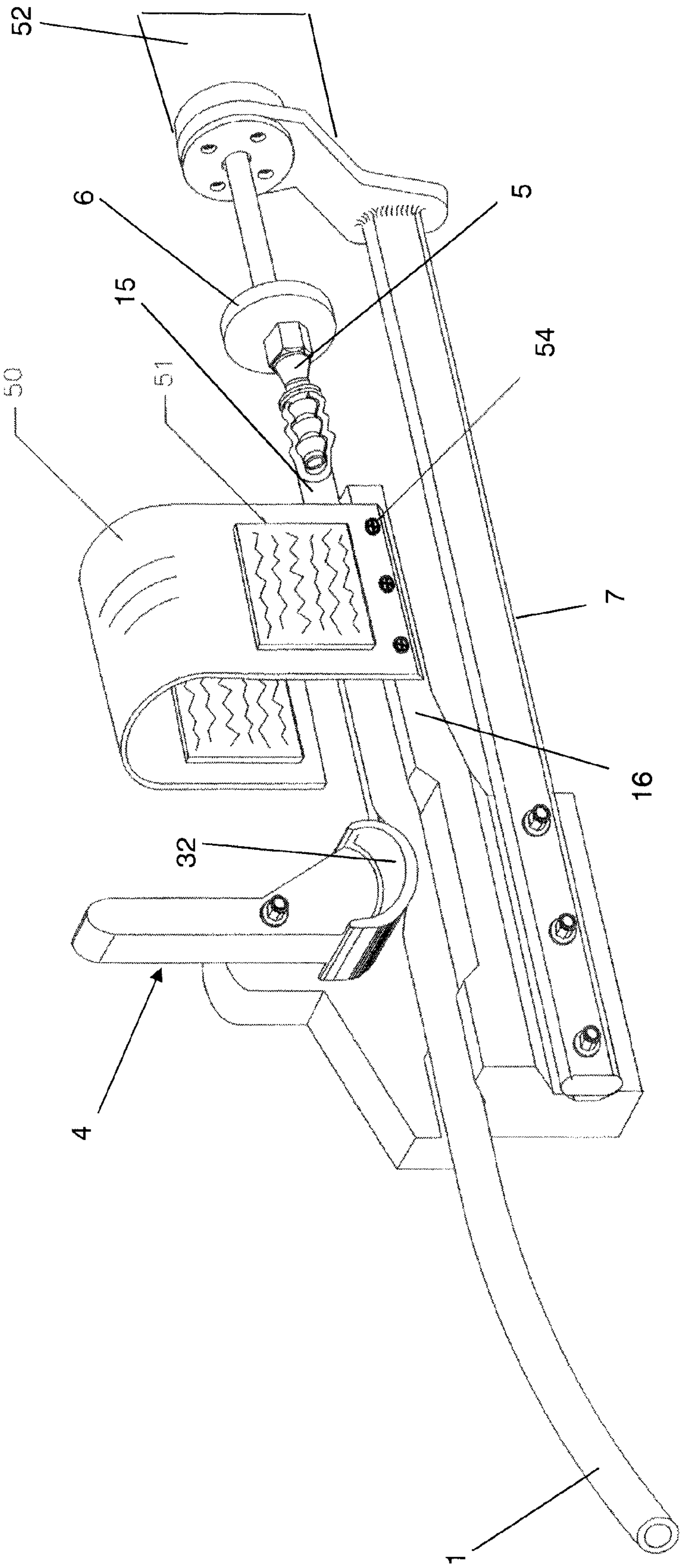
FIGS. 5 and 6 are drawings illustrating perspective views of an embodiment of the present invention wherein a strap member is wrapped around a portion of hose and which holds the hose during installation of a fitting.
Figure 6:
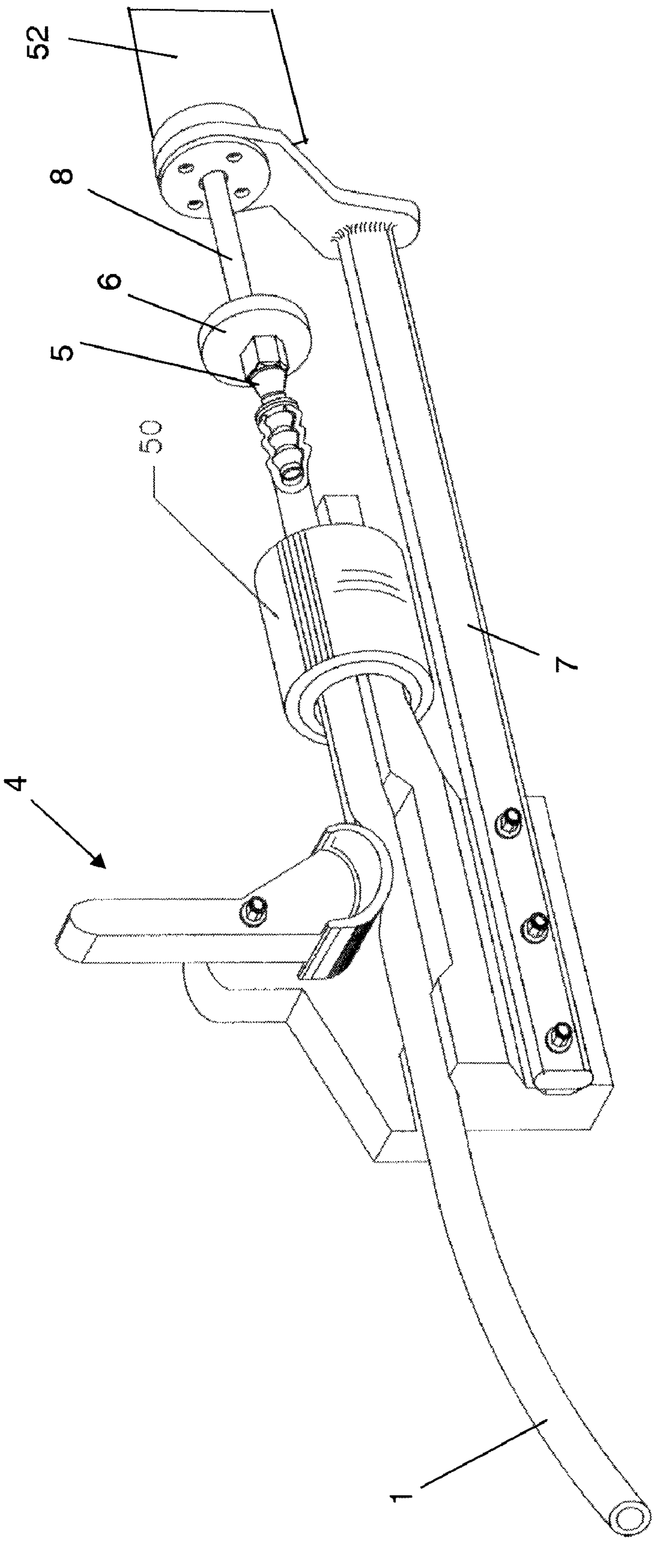

As illustrated in the embodiment of FIGS. 5 and 6, strap 50 is preferably provided to help hold a hose 1 in place during installation of fitting 5. FIG. 5 illustrates strap 50 in a partially extended configuration. As illustrated therein, one or more fasteners 54, or another fastening method, including but not limited to tying, clamping, and/or adhering with an adhesive, are preferably provided to attach an end portion of strap 50 to platform 16. While strap 50 can comprise virtually any flexible material having a sufficient tensile strength to at least partially hold hose 1 during installation of fitting 5, strap 50 is most preferably a synthetic material such as nylon, Kevlar®, or a flexible metal. In addition, once wrapped around hose 1 and platform 16, strap 50 can be secured with any known method including but not limited to simply holding an outside portion of the wrapped strap with a user's hand. However, strap 50 is most preferably held in place with one or more pieces of hook and loop tape 51. FIG. 6 illustrates strap 50 installed around a portion of hose 1, thus covering fasteners 54 and hook and loop tape 51.

Although FIGS. 5 and 6 illustrate lever 4 used in conjunction with strap 50, lever 4 is not required to provide desirable results, and strap 50 can thus be used alone in place of lever 4. In this embodiment, lever 4 is preferably not provided and strap 50 is most preferably attached near a terminal end of mounting bar 7 and/or a portion of platform 16.

Figure 7:
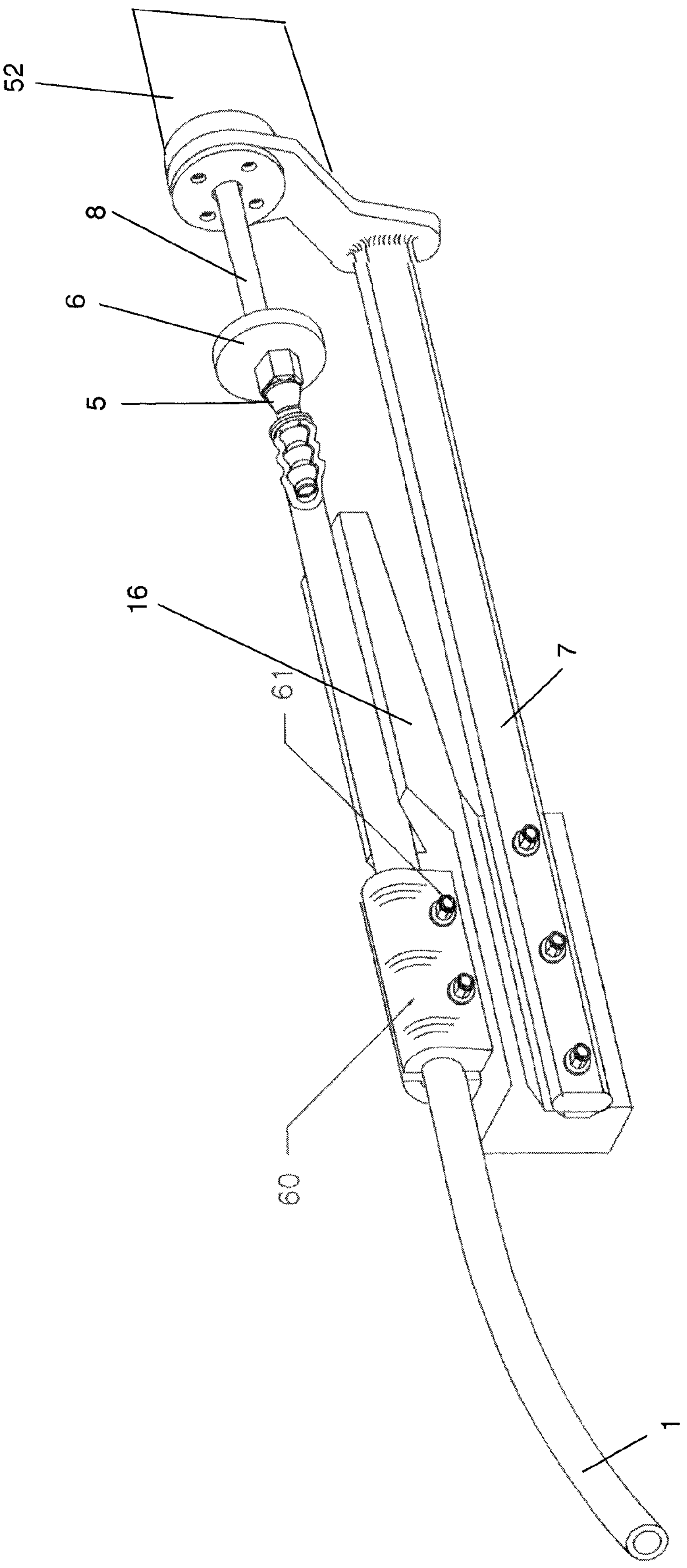
FIG. 7 is a drawing illustrating a perspective view of an embodiment of the present invention wherein clamping members are provided to hold a portion of a hose during installation of a fitting.

FIG. 7 illustrates an embodiment of the present invention wherein clamp 60 is used to hold hose 1. Clamp 60 is shown only for illustrative purposes and can comprise any clamping mechanism capable of at least partially holding a portion of hose 1 during installation of fitting 5. Clamp 60 most preferably comprises one or more components which at least partially close to form a recess for holding hose 1. More preferably still, the internal recess formed by the components of clamp 60 preferably comprises one or more ribs, ridges, or other friction members which help to prevent and/or reduce the tendency of hose 1 to retreat while fitting 5 is inserted therein. Although platform 16 is illustrated as being disposed next to clamp 60, desirable results can still be obtained without platform 16 or with clamp 60 disposed on or incorporated into platform 16. In one embodiment, clamp 60 comprises one or more mechanisms 61 which permit a user to open and close clamp 60 for insertion and removal of hose 1 therefrom. In one embodiment, clamp 60 can comprise an inflatable bladder which resides in at least partial contact with hose 1 and which can be filled with a fluid or a gas to press against and thus at least partially hold hose 1 during installation of fitting 5.

Figure 8:
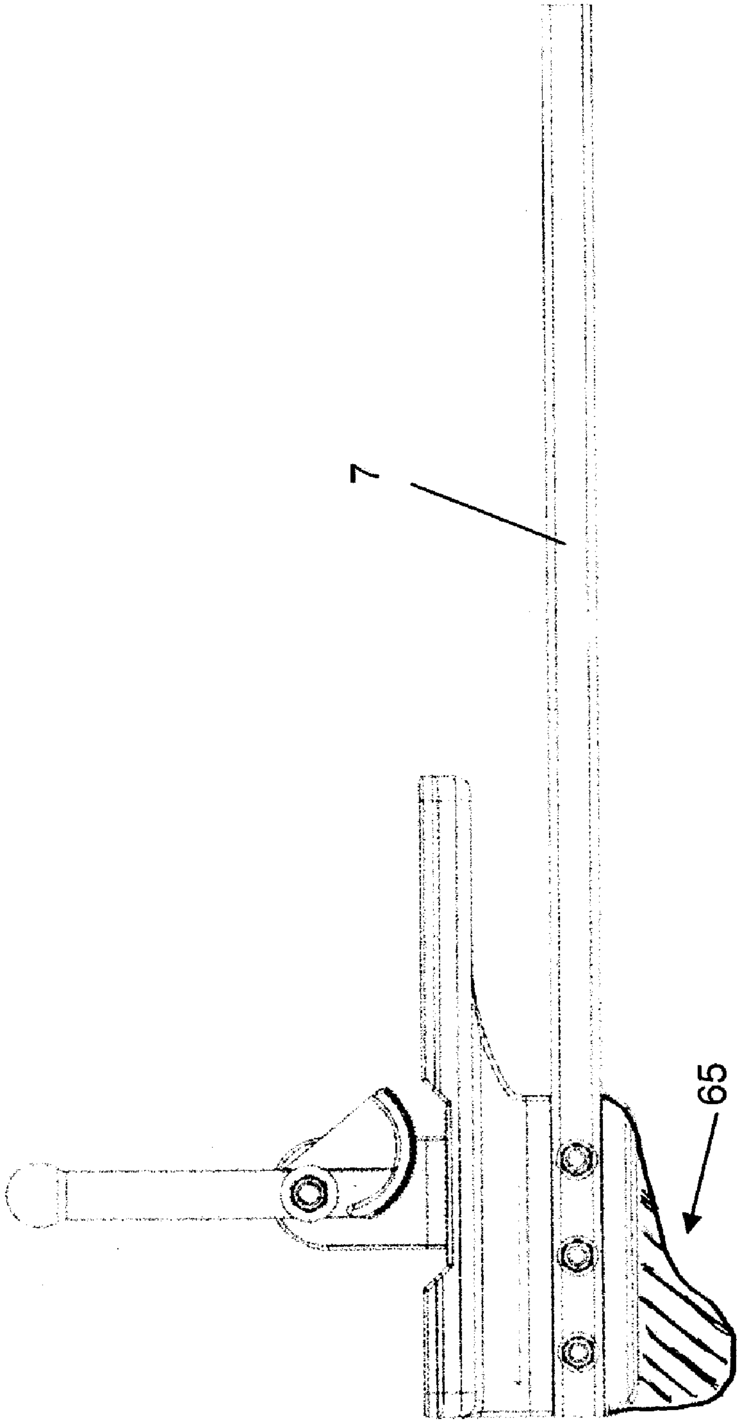
FIG. 8 is a drawing illustrating an embodiment of the present invention wherein a mounting plate is provided for optionally securing an embodiment of the fitting inserter of the present invention.

FIG. 8 illustrates an embodiment of the present invention wherein mounting bracket 65 is secured thereto. As illustrated in FIG. 8, mounting bracket 65 is preferably attached and/or attachable to mounting bar 7, however, bracket 65 can attach to virtually any portion of the fitting inserter of the present invention so long as the present invention can still be operated when bracket 65 is secured thereto. In addition, bracket 65 can comprise virtually any size and/or shape as will be apparent to those skilled in the art upon studying this application. In one embodiment, bracket 65 comprises one or more holes, notches, protrusions, and/or combinations thereof and/or the like which permit bracket to be secured to a structure or to be held by a structure, including but not limited to bolting bracket 65 to a bench and/or to clamping bracket 65 into a vice.

In one embodiment, one or more protruding members can extend from pad 6 toward end 15 of hose 1. In this embodiment, fitting 5 can thus be placed onto the one or more protruding members such that fitting 5 remains in place against pad 6 without requiring a user to hold fitting 5 to prevent it from falling out of alignment with an end 15 of hose 1.

As can be seen in the foregoing illustrations in a most preferred embodiment of the present invention, end 15 of hose 1 is most preferably held substantially perpendicular with pad 6 and end 15 is preferably held in a substantially parallel relationship with shaft 8. Although embodiments of the present invention provide desirable results wherein shaft 8 is permitted to rotate, in a most preferred embodiment, shaft 8 preferably translates and can rotate only slightly or not at all. Further, although some embodiments of the present invention provide desirable results when pad 6 is permitted to rotate with respect to a clamp 60, strap 50, and/or platform 16, in a most preferred embodiment pad 6 preferably does not rotate with respect to clamp 60, strap 50, and/or platform 16. The various apparatuses and methods for holding a hose are occasionally referred to in the specification and claims as a hose securer and the various apparatuses and/or methods for imparting a force to the fitting are occasionally referred to in the specification and claims as a fitting inserter.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus comprising:
- a mounting bar;
- a fitting inserter attached to a first end of said mounting bar comprising a translationally movable shaft;
- a first hose securer comprising a clamp and an elongated compression component, said elongated compression component having a primary axis that substantially parallels a first portion of a hose held thereby, said elongated compression component disposed in a substantially parallel arrangement with said bar;
- a second hose securer;
- a pushing mechanism having an actuator, said actuator comprising an actuation mechanism; and
- said first hose securer disposed between said second hose securer and said fitting inserter.

2. The apparatus of claim 1 wherein said fitting inserter further comprises a pad.

3. The apparatus of claim 2 wherein said pad comprises one or more protrusions for holding a fitting.

4. The apparatus of claim 1 wherein said elongated compression component comprises one or more friction members disposed thereon.

5. The apparatus of claim 1 wherein said compression component comprises a v-shape.

6. The apparatus of claim 5 wherein said compression component comprises a curve.

7. The apparatus of claim 5 wherein said hose securer comprises a diameter adjustment mechanism.

8. A fitting insertion apparatus comprising:
- a hose securer comprising:
  - first and second hose securers configured to hold first and second portions of a hose; and
  - an elongated surface for placement of at least a portion of the hose, said elongated surface comprising a primary axis that substantially parallels the portion of the hose, said elongated surface component comprising a channel disposed in a substantially parallel arrangement with said bar; and
- a fitting inserter comprising a translationally movable shaft; and
- a pushing mechanism, said a pushing mechanism comprising an actuator, said actuator comprising an actuation mechanism.

9. The fitting insertion apparatus of claim 8 wherein said first hose securer comprises a lever-activated compression clamp.

10. The fitting insertion apparatus of claim 8 wherein said first hose securer comprises a strap.

11. The fitting insertion apparatus of claim 8 wherein said translationally movable shaft is hand-powered.

12. The fitting insertion apparatus of claim 8 wherein said translationally movable shaft is electrically-powered.

13. The fitting insertion apparatus of claim 8 wherein said translationally movable shaft is pneumatically-powered.

14. The fitting insertion apparatus of claim 8 wherein said translationally movable shaft is hydraulically-powered.

15. A method for inserting a fitting into a hose end comprising:
- holding a fitting insertion tool comprising a fitting inserter and a first hose securer in a user's first hand, wherein all of a weight of the tool is supported by the user's hand;
- providing a hose having at least a first end;
- disposing a first portion of the hose into the first hose securer;
- securing an end portion of the hose with a second hose securer;
- disposing a fitting partially within an end of the hose;
- actuating a pushing mechanism;
- pressing the fitting into the end of the hose with the pushing mechanism; and
- removing the hose from the hose securers.

16. The method of claim 15 wherein pressing the fitting into the end of the hose comprises the user's hand repetitiously squeezing a handle portion of the fitting inserter.

17. The method of claim 15 wherein disposing a first portion of the hose into a first hose securer comprises contacting an outer surface of the hose with a lever-activated compression clamp.

18. The method of claim 15 further comprising activating a release mechanism.

19. A method for inserting a fitting into a hose comprising:
- disposing a hose having at least a first end into a first hose securing mechanism comprising a strap and an elongated channel component;
- disposing a fitting at least partially within the first end of the hose; and
- advancing the fitting into the first end of the hose with an actuating mechanism of an actuator in a series of distinct advancements of substantially equal distances.

20. The method of claim 19 wherein advancing the fitting comprises repetitiously activating a pushing mechanism.

21. The method of claim 20 wherein repetitiously activating a pushing mechanism comprises repetitiously activating a hand-powered pushing mechanism.

22. The method of claim 20 wherein repetitiously activating a pushing mechanism comprises repetitiously activating a pushing mechanism by hand.

23. The method of claim 20 further comprising securing a portion of the hose with a second hose securing mechanism.

24. The method of claim 20 wherein advancing the fitting comprises advancing the fitting with a translationally movable shaft.

25. The method of claim 20 further comprising retracting a translationally movable shaft.

* * * * *